US010995302B2

(12) United States Patent
Adriaenssens et al.

(10) Patent No.: US 10,995,302 B2
(45) Date of Patent: May 4, 2021

(54) LIQUID ACIDIC HARD SURFACE CLEANING COMPOSITIONS HAVING IMPROVED VISCOSITY

(71) Applicant: The Procter & Gamble Company, Cincinnati, OH (US)

(72) Inventors: Kris Adriaenssens, Boortmeerbeek (BE); Anna Asmanidou, Brussels (BE); Hayat El Kah, Brussels (BE); Coralie Paule Jeannine Naudin, Woluwe St. Lambert (BE); Stefano Scialla, Strombeek-bever (BE); Kim Tastenhoye, Hoeilaart (BE)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 16/408,490

(22) Filed: May 10, 2019

(65) Prior Publication Data
US 2019/0352579 A1  Nov. 21, 2019

(30) Foreign Application Priority Data

May 15, 2018  (EP) ..................................... 18172223
Jan. 9, 2019   (EP) ..................................... 19150943

(51) Int. Cl.
C11D 3/37    (2006.01)
C11D 3/34    (2006.01)
C11D 1/72    (2006.01)
C11D 3/20    (2006.01)
C11D 3/22    (2006.01)
C11D 11/00   (2006.01)

(52) U.S. Cl.
CPC .............. *C11D 3/3418* (2013.01); *C11D 1/72* (2013.01); *C11D 3/2079* (2013.01); *C11D 3/2086* (2013.01); *C11D 3/222* (2013.01); *C11D 3/3769* (2013.01); C11D 11/0023 (2013.01)

(58) Field of Classification Search
CPC .......................... C11D 3/3769; C11D 11/0023
USPC ......................................................... 510/238
See application file for complete search history.

(56) References Cited

U.S. PATENT DOCUMENTS

| 5,234,617 | A | 8/1993 | Hunter |
| 6,358,912 | B1 | 3/2002 | Evers |
| 6,482,793 | B1 | 11/2002 | Gordon |
| 7,608,570 | B2 | 10/2009 | Tomarchio |
| 8,546,317 | B2 | 10/2013 | Mertens |
| 2003/0017960 | A1 | 1/2003 | Bertrem |
| 2012/0149623 | A1 | 6/2012 | Li |
| 2013/0157921 | A1 | 6/2013 | Marin |
| 2014/0308227 | A1* | 10/2014 | Mabille .................. A61K 8/922 424/70.13 |
| 2016/0271031 | A1* | 9/2016 | Schweinsberg .......... A61Q 5/10 |

FOREIGN PATENT DOCUMENTS

| EP | 1167500 A1 | 1/2002 |
| WO | WO2007119195 A2 | 10/2007 |
| WO | WO2018036864 A1 | 3/2018 |

OTHER PUBLICATIONS

Extended European Search Report; Application No. 18172223.2-1105; dated Nov. 10, 2018; 10 pages.
Extended European Search Report; Application No. 19150943.9-1105; dated Sep. 7, 2019; 10 pages.

\* cited by examiner

*Primary Examiner* — Gregory E Webb
(74) *Attorney, Agent, or Firm* — John T. Dipre

(57) ABSTRACT

The need for an acidic hard surface cleaning composition which provides further improvements in the maintenance of surface shine, especially on inclined hard surfaces, while also using less thickener is met by formulating the acidic hard surface cleaning composition using a combination of a surface modification polymer and sulfonate hydrotrope.

17 Claims, No Drawings

LIQUID ACIDIC HARD SURFACE CLEANING COMPOSITIONS HAVING IMPROVED VISCOSITY

TECHNICAL FIELD

The present invention relates to acidic liquid compositions for cleaning a variety of hard surfaces such as hard surfaces found in around the house, including bathrooms, toilets, garages, driveways, basements, gardens, kitchens, etc. The hard surface cleaning compositions provide improved viscosity and hence provided improved efficacy on inclined surfaces.

BACKGROUND OF THE INVENTION

Limescale deposits are formed due to the fact that tap water contains a certain amount of solubilised ions, which upon water evaporation eventually deposit as salts, such as calcium carbonate on hard surfaces. These visible limescale deposits result in hard deposits around taps, sink holes, and the like, but also splash marks where water has sprayed and then dried. The limescale formation and deposition phenomenon is even more acute in places where water is particularly hard. Acidic liquid compositions for cleaning limescale from hard-surfaces have been disclosed in the art. Such acidic cleaning compositions react with the limescale in order to remove such unsightly deposits. Surface modification polymers, such as polyvinyl pyrrolidone and copolymers thereof, have also been added to acidic cleaners, to improve the beading of water on the treated surface and hence maintain surface shine after subsequent application of water to the treated surface. However, as the beads of water dry, the precipitation of calcium carbonate and other soluble salts leads to splash marks and other water marks on the surface, which reduce surface shine. The acidic hard surface cleaning composition can comprise a thickener to improve the removal of limescale and watermarks on inclined surfaces. On such surfaces, unthickened compositions can dribble down the surface before it has had sufficient time to act on the limescale and other watermarks. Indeed, such compositions can lead to worse surface shine since the limescale deposits are unevenly removed and dribble marks can become evident on the treated surface, especially glass. However, the presence of a thickener, especially at high levels, can slow down limescale removal and also lead to reduced shine from smearing during post-treatment wiping. In addition, thickeners are typically costly ingredients and hence there is a desire to achieve higher viscosities while using less thickener.

Hence, a need remains for acidic hard surface cleaning compositions which provide further improvements in the maintenance of surface shine, especially on inclined hard surfaces, and preferably using less thickener.

WO 93/21296 relates to aqueous liquid bleach composition containing solid, water-insoluble organic peroxyacid, bleach-stable, stilbene fluorescent whitening agent, and polyvinyl pyrrolidone or polyvinyl alcohol.

SUMMARY OF THE INVENTION

The present invention relates to a liquid hard surface cleaning composition comprising: a surface modification polymer, wherein the surface modification polymer is selected from the group consisting of: copolymers of corn starch, acrylic acid (or salts thereof) and acrylamide-propyl-methyl-ammonium chloride (polyquarternium 95); copolymers of diallyldimethylammonium chloride and acrylic acid (or salts thereof); and mixtures thereof); and sulfonate hydrotrope. Since the composition is a hard surface cleaning composition, the composition does not comprise fluorescent whitening agent. The present invention further relates to a method of treating a hard surface, preferably of removing limescale from an inclined hard surface, comprising the steps of: applying a composition according to any preceding claims onto the hard surface; optionally leaving said composition on said surface, preferably for a period comprised between 10 seconds and 10 minutes; optionally wiping said hard-surface; and preferably rinsing said hard surface with water.

DETAILED DESCRIPTION OF THE INVENTION

The present compositions, comprising a surface modification polymer and sulfonate hydrotrope provide improvements in the maintenance of surface shine, especially on inclined hard surfaces, and require less thickener to achieve the desired viscosity.

As defined herein, "essentially free of" a component means that no amount of that component is deliberately incorporated into the composition. Preferably, "essentially free of" a component means that no amount of that component is present in the composition.

As defined herein, "stable" means that no visible phase separation is observed for a premix kept at 25° C. for a period of at least two weeks, or at least four weeks, or greater than a month or greater than four months, as measured using the Floc Formation Test, described in USPA 2008/0263780 A1.

All percentages, ratios and proportions used herein are by weight percent of the composition, unless otherwise specified. All average values are calculated "by weight" of the composition, unless otherwise expressly indicated.

All ratios are calculated as a weight/weight level of the active material, unless otherwise specified. All measurements are performed at 25° C. unless otherwise specified.

Unless otherwise noted, all component or composition levels are in reference to the active portion of that component or composition, and are exclusive of impurities, for example, residual solvents or by-products, which may be present in commercially available sources of such components or compositions.

By "molar mass" it is meant herein unless otherwise stated, the average molar mass in absolute mass, expressed in g/mol. For polymers, this can be determined by gel permeation chromatography (GPC), preferably using GPC-LS (light scattering), such as the G1260 Infinity II Multi-Detector GPC/SEC System from Agilent Technologies. For water-soluble polymers, water can be used as a solvent (with the addition of methanol as needed up to 50% by weight), using an Agilent PL aquagel-OH column. For non-aqueous polymers, toluene can be used as a solvent, using an Agilent PLgel column.

The Liquid Acidic Hard Surface Cleaning Composition

The compositions according to the present invention are designed as hard surfaces cleaners. The compositions according to the present invention are liquid compositions (including gels) as opposed to a solid or a gas.

The liquid acidic hard surface cleaning compositions according to the present invention are preferably aqueous compositions. Therefore, they may comprise from 70% to 99% by weight of the total composition of water, preferably from 75% to 95% and more preferably from 80% to 95%.

The compositions herein may have a water-like viscosity. By "water-like viscosity" it is meant herein a viscosity that is close to that of water. In other embodiments, the compositions herein are thickened compositions. Thus, the liquid acidic hard surface cleaning compositions herein preferably have a viscosity of from 50 cps to 5000 cps at 10 s$^{-1}$, more preferably from 50 cps to 2000 cps, yet more preferably from 50 cps to 1000 cps and most preferably from 50 cps to 500 cps at 10 s$^{-1}$ and 20° C. Preferably, the thickened compositions according to this specific embodiment are shear-thinning compositions.

Surface Modification Polymer:

The surface modification polymer deposit onto the hard surface and limit limescale and other deposits from adhering to the treated surface. The surface modification polymer acts to provide for initial cleaning or pretreatment of the hard surface and provides a barrier layer on the surface which provides residual prevention of deposits to the hard surface for an extended number of cleanings.

Suitable surface modification polymers are selected from the group consisting of: copolymers of corn starch, acrylic acid (or salts thereof) and acrylamido-propyl-methyl-ammonium chloride (polyquarternium 95); copolymers of diallyldimethylammonium chloride and acrylic acid (or salts thereof); and mixtures thereof.

Unless otherwise specified, suitable surface modification polymers can have a weight average molecular weight of from 2,000 to 1,000,000 Da, preferably from 5,000 to 500,000 Da, more preferably from 10,000 to 300,000 Da.

The surface modification polymer can be present at a level of from 0.01% to 5%, preferably from 0.02% to 2%, more preferably from 0.05% to 1.0% by weight of the composition.

The surface modification polymers of use in the compositions of the present invention are generally provided as a mixture which includes the polymer dispersed in an aqueous or aqueous/alcoholic carrier.

Copolymers of corn starch, acrylic acid (or salts thereof) and acrylamide-propyl-methyl-ammonium chloride:

Suitable surface modification polymers include polyquarternium 95, a copolymer of corn starch, acrylic acid (or salts thereof) and acrylamido-propyl-methyl-ammonium chloride, as sold under the PolyQuart Ecoclean™ brand name by BASF.

Copolymers of diallyldimethylammonium chloride and acrylic acid:

Suitable copolymers of diallyldimethylammonium chloride (DADMAC) and acrylic acid (or salts thereof) include those according to the formula of copolymer I comprising in the form of polymerized units:

(a) at least a monomer compound of general formula (i):

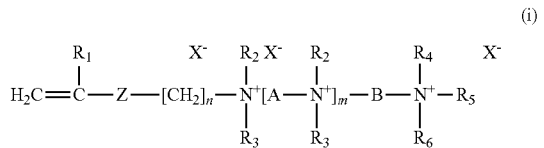

(i)

in which
R$_1$ is a hydrogen atom, a methyl or ethyl group;
R$_2$, R$_3$, R$_4$, R$_5$ and R$_6$, which are identical or different, are linear or branched C$_1$-C$_6$, alkyl, hydroxyalkyl or aminoalkyl groups;
m is an integer from 0 to 10;
n is an integer from 1 to 6;
Z represents a —C(O)O— or —C(O)NH— group or an oxygen atom;
A represents a (CH$_2$)$_p$ group, p being an integer from 1 to 6;
B represents a linear or branched C$_2$-C$_{12}$, polymethylene chain optionally interrupted by one or more heteroatoms or heterogroups, and optionally substituted by one or more hydroxyl or amino groups;
X$^-$, which are identical or different, represent counterions; and (b) at least one hydrophilic monomer carrying a functional acidic group which is copolymerisable with (a) and which is capable of being ionized in aqueous solution;

(c) optionally at least one monomer compound with ethylenic unsaturation with a neutral charge which is copolymerisable with (a) and (b), preferably a hydrophilic monomer compound with ethylenic unsaturation with a neutral charge, carrying one or more hydrophilic groups, which is copolymerisable with (a) and (b).

(a) can be a diquat of following formula:

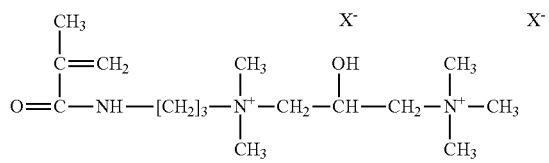

in which X$^-$ represents the chloride ion.

The monomers (b) can be C$_3$-C$_8$ carboxylic with monoethylenic unsaturation (counting the carbon of the carboxylic acid in the C3-C8), their anhydrides and their salts which are soluble in water and mixture thereof. Preferred monomers (b) are acrylic acid, methacrylic acid, and the alkali metal and ammonium salts thereof, and mixtures thereof. Acrylic acid, and the alkali metal and ammonium salts thereof, are particularly preferred.

Preferred optional monomers (c) include acrylamide, vinyl alcohol, C$_1$-C$_4$ alkyl esters of acrylic acid and of methacrylic acid, C$_1$-C$_4$ hydroxyalkyl esters of acrylic acid and of methacrylic acid, in particular ethylene glycol and propylene glycol acrylate and methacrylate, polyalkoxylated esters of acrylic acid and of methacrylic acid, in particular the polyethylene glycol and polypropylene glycol esters, esters of acrylic acid or of methacrylic acid and of polyethylene glycol or polypropylene glycol C$_1$-C$_{25}$ monoalkyl ethers, vinyl acetate, vinylpyrrolidone or methyl vinyl ether and mixtures thereof.

The level of monomers (a) can be from 3 to 80 mol %, preferably from 10 to 70 mol %. The level of monomers (b) can be from 10 to 95 mol %, preferably 20 to 80 mol %. The level of monomers (c) can be from 0 mol % to 50 mol %, preferably from 0 mol % to 30 mol %, most preferably from 0 mol %. The molar ratio of cationic monomer to the anionic monomer (a)/(b) is preferably from 80/20 to 5/95, preferably from 60/40 to 20/80.

The copolymer I preferably has a weight average molecular weight of from 10,000 Da to 10,000,000 Da, more preferably from 500,000 Da to 5,000,000 Da, most preferably from 700,000 Da to 2,000,000 Da, determined by aqueous gel permeation chromatography (GPC), preferably using GPC-LS (light scattering), such as GPC-MALS (Multi-angle light scattering) using the Viscotek SEC- MALS 20 supplied by Malvern Instruments. The copolymer I is preferably a random copolymer.

Suitable copolymers of diallyldimethylammonium chloride and acrylic acid (or salts thereof) include those according to the formula of copolymer II comprising in the form of polymerized units:

(d) at least a monomer compound of general formula ii:

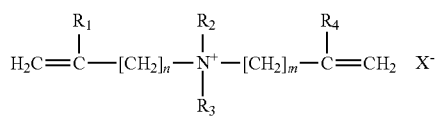

in which:

R1 and R4 independently represent H or a C1-6 linear or branched alkyl group;

R2 and R3 independently represent a linear or branched C1-6 alkyl, hydroxyalkyl or aminoalkyl group, preferably a methyl group;

n and m are integers of from 1 to 3;

$X^-$ represents a counterion compatible with the copolymer;

(e) at least one hydrophilic monomer with an acid functionality that is copolymerisable with monomer d) and capable of ionizing in the medium in which it is used; and (f) optionally an ethylenically unsaturated hydrophilic monomer compound of neutral charge bearing one or several hydrophilic groups which is copolymerisable with monomers d) and e); the monomer d) to monomer e) ratio ranging from 60:40 to 5:95.

More preferably, $R_1$ represents hydrogen, $R_2$ represents methyl, $R_3$ represents methyl, $R_4$ represents hydrogen, and m and n are equal to 1. The ion $X^-$ is preferably chosen from halogen, sulfate, hydrogen sulfate, phosphate, citrate, formate and acetate.

The monomer (d) preferably has the following structure:

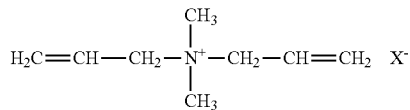

wherein $X^-$ is defined above. One monomer (d) which is particularly preferred is that of the above formula in which $X^-$ represents $Cl^-$, this monomer being known as diallyl dimethyl ammonium chloride (DADMAC).

The monomers (e) can be $C_3$-$C_8$ carboxylic with monoethylenic unsaturation (counting the carbon of the carboxylic acid in the C3-C8), their anhydrides and their salts which are soluble in water and mixture thereof. Preferred monomers (e) are acrylic acid, methacrylic acid, and the alkali metal and ammonium salts thereof, and mixtures thereof. Acrylic acid, and the alkali metal and ammonium salts thereof, are particularly preferred.

Among the monomers (f) are those selected from the group consisting of acrylamide, vinyl alcohol, $C_1$-$C_4$ alkyl esters of acrylic acid and of methacrylic acid, $C_1$-$C_4$ hydroxyalkyl esters of acrylic acid and of methacrylic acid, in particular ethylene glycol and propylene glycol acrylate and methacrylate, polyalkoxylated esters of acrylic acid and of methacrylic acid, in particular the polyethylene glycol and polypropylene glycol esters.

The monomer (d) content is advantageously from 5 mol % to 60 mol %, preferably 20 mol % to 50 mol %. The monomer (e) content is advantageously from 10 mol % to 95 mol %, preferably 20 mol % to 80 mol %. The monomer (f) content is advantageously from 0 mol % to 50 mol %, preferably from 5 mol % to 30 mol %. The d:e molar ratio is preferably from 50:50 to 10:90.

The following copolymers II are most particularly preferred: DADMAC/acrylic acid/acrylamide copolymer; DADMAC/maleic acid copolymer; DADMAC/sulfonic acid copolymer; the DADMAC/acidic monomer molar ratio being from 60:40 to 5:95, preferably from 50:50 to 10:90. DADMAC stands for diallyl dimethyl ammonium chloride. Preferred copolymer II are available from Rhodia; an alternative is available from Reckitt-Benckiser under the tradename Merquat 280. A particularly preferred copolymer II is

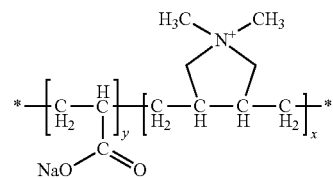

The copolymer II preferably has a weight average molecular weight of from 10,000 Da to 3,000,000 Da, more preferably from 100,000 Da to 1,000,000 Da, most preferably from 200,000 Da to 500,000 Da.

Preferred water-soluble or water-dispersible copolymer herein are available from Solvay.

Suitable copolymers of diallyldimethylammonium chloride and acrylic acid (or salts thereof) are further described in WO2007/119195, particularly from page 7, line 1, to 17, line 8.

Additional Surface Modification Polymer:

While not preferred, the composition can comprise additional surface modification polymers. In preferred compositions, no additional surface modification polymers are present. Suitable additional surface modification polymers are described below:

Vinylpyrrolidone homopolymers and copolymers:

The compositions of the present invention can comprise a vinylpyrrolidone homopolymer or copolymer.

Suitable vinylpyrrolidone homopolymers for use herein are homopolymers of N-vinylpyrrolidone having the following repeating monomer:

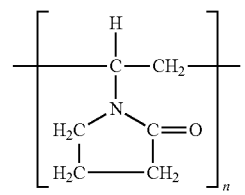

n (degree of polymerisation) can be such that the weight average molecular weight of the homopolymer is from 1,000 to 100,000,000, preferably from 10,000 to 1,000,000, more preferably from 25,000 to 7,500,000, and most preferably from 300,000 to 500,000.

Suitable vinylpyrrolidone homopolymers are commercially available from ISP Corporation, New York, N.Y. and Montreal, Canada under the product names PVP K-15®

(viscosity molecular weight of 10,000), PVP K-30® (average molecular weight of 40,000), PVP K-60® (average molecular weight of 160,000), and PVP K-90® (average molecular weight of 360,000). Other suitable vinylpyrrolidone homopolymers which are commercially available from BASF Cooperation include Sokalan HP 165®, Sokalan HP 12®, Luviskol K30®, Luviskol K60®, Luviskol K80®, Luviskol K90®; vinylpyrrolidone homopolymers known to persons skilled in the detergent field (see for example EP-A-262,897 and EP-A-256,696).

Suitable vinylpyrrolidone copolymers can have the following structure:

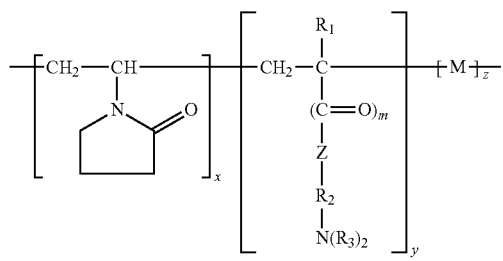

wherein:
x is from 20 to 99 mol %, preferably from 40 to 99 mol %;
y is from 1 to 80 mol %, preferably from 1 to 40 mol %;
z is from 0 to 50 mol %, preferably 0 mol %;
such that (x+y+z)=100;
m is from 1 to 3, preferably 1;
$R_1$ is H or $CH_3$;
Z is O or NH;
$R_2$ is $C_aH_{2a}$, wherein a is from 1 to 4, preferably 2;
$R_3$ is independently $C_1$ to $C_4$ alkyl; and
M is a vinyl or vinylidene monomer, preferably copolymerisable with vinyl pyrrolidone other than the monomer identified in [ ]$_y$.

Such vinylpyrrolidone copolymers are more fully described in U.S. Pat. Nos. 4,445,521, 4,165,367, 4,223,009, 3,954,960, as well as GB1331819.

The monomer unit within [ ]$_y$ is, for example, a dialkylamine alkyl acrylate or methacrylate or a vinyl ether derivative. Examples of these monomers include dimethylaminomethyl acrylate, dimethylaminomethyl methacrylate, diethylaminomethyl acrylate, diethylaminomethyl methacrylate, dimethylaminoethyl acrylate, dimethylaminoethyl methacrylate, dimethylaminobutyl acrylate, dimethylaminobutyl methacrylate, dimethylaminoamyl methacrylate, diethylaminoamyl methacrylate, dimethylaminohexyl acrylate, diethylaminohexyl methacrylate, dimethylaminooctyl acrylate, dimethylaminooctyl methacrylate, diethylaminooctyl acrylate, diethylaminooctyl methacrylate, dimethylaminodecyl methacrylate, dimethylaminododecyl methacrylate, diethylaminolauryl acrylate, diethylaminolauryl methacrylate, dimethylaminostearyl acrylate, dimethylaminostearyl methacrylate, diethylaminostearyl acrylate, diethylaminostearyl methacrylate, di-t-butylaminoethyl methacrylate, di-t-butylaminoethyl acrylate, and dimethylamino vinyl ether.

Monomer M, which is optional (z is up to 50) can comprise any conventional vinyl monomer copolymerisable with N-vinyl pyrrolidone. Suitable conventional vinyl monomers include the alkyl vinyl ethers, e.g., methyl vinyl ether, ethyl vinyl ether, octyl vinyl ether, etc.; acrylic and methacrylic acid and esters thereof, e.g., methacrylate, methyl methacrylate, etc.; vinyl aromatic monomers, e.g., styrene, α-methyl styrene, etc.; vinyl acetate; vinyl alcohol; vinylidene chloride; acrylonitrile and substituted derivatives thereof; methacrylonitrile and substituted derivatives thereof; acrylamide and methacrylamide and N-substituted derivatives thereof; vinyl chloride, crotonic acid and esters thereof; etc.

Suitable polyvinylpyrrolidone copolymers include vinylpyrrolidone/dimethylaminoethyl-methacrylate (VP/DMAEMA) copolymers having the formula:

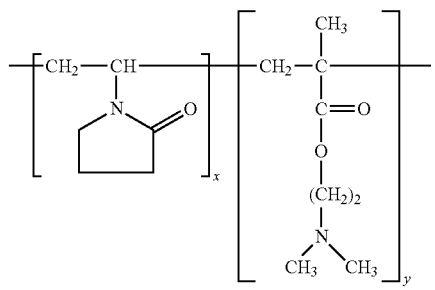

wherein x and y have values selected such that the weight average molecular weight of the copolymer is from 50,000 to 5,000,000 Da, preferably 100,000 Da to 2,500,000 Da, more preferably from 500,000 to 1,500,000 Da.

Suitable polymers are available commercially, including from Ashland Inc. under the tradenames Sorez™ HS-205, copolymer 845, copolymer 937, copolymer 958.

Suitable vinylpyrrolidone/dialkylaminoalkyl acrylate or methacrylate copolymers are commercially available under the name copolymer 845®, Gafquat 734®, or Gafquat 755® from ISP Corporation, New York, N.Y. and Montreal, Canada or from BASF under the tradename Luviquat®.

Suitable copolymers of vinylpyrrolidone for use herein include copolymers of N-vinylpyrrolidone and alkylenically unsaturated monomers or mixtures thereof.

The alkylenically unsaturated monomers of the copolymers herein include unsaturated dicarboxylic acids such as maleic acid, chloromaleic acid, fumaric acid, itaconic acid, citraconic acid, phenylmaleic acid, aconitic acid, acrylic acid, N-vinylimidazole and vinyl acetate. Any of the anhydrides of the unsaturated acids may be employed, for example acrylic anhydride or methacrylic anhydride. Aromatic monomers like styrene, sulphonated styrene, alpha-methyl styrene, vinyl toluene, t-butyl styrene and similar well-known monomers may be used.

Such copolymers of N-vinylpyrrolidone and alkylenically unsaturated monomers like PVP/vinyl acetate copolymers are commercially available under the trade name Luviskol® series from BASF. The copolymers of vinylpyrrolidone for use in the compositions of the present invention also include quaternized or unquaternized vinylpyrrolidone/dialkylaminoalkyl acrylate or methacrylate copolymers.

Polysulphobetaine Polymer:

The polysulphobetaine polymer suitable for use in the present compositions comprise a zwitterionic unit A or a mixture thereof, wherein the zwitterionic unit A has a sulphobetaine group or a mixture thereof.

The polysulphobetaine polymer can be a homopolymer or a copolymer comprising one or more of zwitterionic units A, though homopolymers are preferred.

The betaine group of the units A contains an anionic group and a cationic group, with at least one of the groups containing a sulphur atom. The anionic group may be a carbonate group, a sulphuric group such as a sulphonate group, a phosphorus group such as a phosphate, phosphonate, phosphinate group, or an ethanolate group. It is preferably a sulphuric group. The cationic group may be an onium or inium group from the nitrogen, phosphate or sulphur family, for example an ammonium, pyridinium, imidazolinimum, phosphonium or sulphonium group. It is preferably an ammonium group (preferably quaternary). Preferably, the betaine group is a sulphobetaine group containing a sulphonate group and a quaternary ammonium group. In zwitterionic units A, the number of positive charges is equal to the number of negative charges, at least in one pH range, such that the units A are electrically neutral in that pH range.

The betaine groups are typically the pendant groups of the polysulphobetaine polymer herein, typically obtained from monomers containing at least one ethylene unsaturation.

Useful betaine groups may be represented, in case of cations from the nitrogen family, by the following formula (I) having a cationic charge at the centre of the function and an anionic charge at the end of the function:

$$—N(^{+})(R^{1})(R^{2})—R-A-O^{(-)}$$ (I)

wherein:
R$^1$ and R$^2$ are the same or different, and represent an alkyl radical containing 1 to 7 carbon atoms, preferably 1 to 2, more preferably 1. R$^1$ and R$^2$ are preferably alkane or alkene groups comprising C and H only.
R represents a linear or branched alkylene radical comprising 1 to 15 carbon atoms, preferably 2 to 4. R can be substituted by one or more hydroxy groups, or a benzylene radical, though this is not preferred.
A represents S(=O)(=O).

The betaine groups may be connected to the carbon atoms of a macromolecular chain derived from the polymerisation of an ethylene unsaturation (dorsal, skeleton) of the polymer by the intermediary, namely of a bivalent or polyvalent hydrocarbon pattern (for example alkylene or arylene), possibly broken by one or several heteroatoms, namely of oxygen or nitrogen, an ester pattern, an amide pattern, or even by a valency link.

The units A may derive from at least one betaine monomer A selected from group consisting of alkyl sulphonates of dialkylammonium alkyl acrylates or methacrylates or methacrylamido selected from the group consisting of:

sulphopropyl dimethyl ammonium ethyl methacrylate, marketed by RASCHIG under the name SPE:

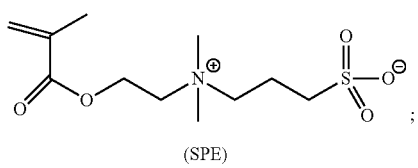 [SMILES: C=C(C)C(=O)OCC[N+](C)(C)CCCS(=O)(=O)[O-]]

(SPE)

sulfohydroxypropyl dimethyl ammonium ethyl methacrylate, marketed by RASCHIG under the name SHPE:

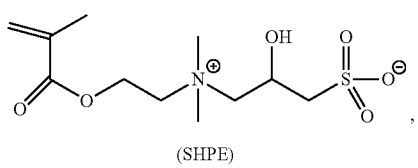 [SMILES: C=C(C)C(=O)OCC[N+](C)(C)CC(O)CS(=O)(=O)[O-]]

(SHPE)

sulphopropyl dimethylammonium propyl methacrylamide, marketed by RASCHIG under the name SPP:

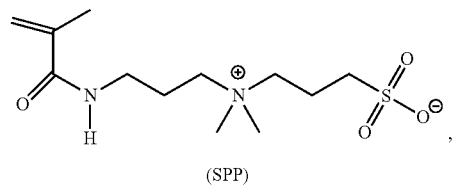

(SPP)

sulphopropyl dimethylammonium ethyl methacrylate, marketed by RASCHIG under the name SPDA:

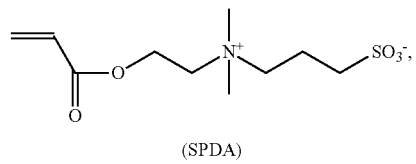

(SPDA)

sulphohydroxypropyl dimethyl ammonium propyl methacrylamido, marketed by RASCHIG under the name SHPP:

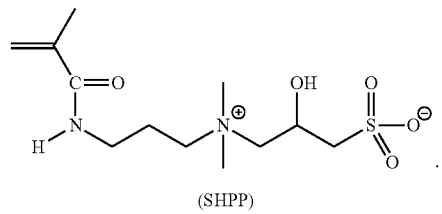

(SHPP)

SPE, SPP, and mixtures thereof are preferred.

The polysulphobetaine polymer herein may have a molar mass going from 5,000 g/mol to 3,000,000 g/mol, preferably from 8,000 to 1,000,000 g/mol, more preferably from 10,000 to 500,000 g/mol.

Suitable polysulphobetaine copolymers can comprise monomers of unit A and unit B, with unit B being at least one hydrophilic monomer carrying a functional acidic group which is copolymerisable with unit A and is preferably capable of being ionized in aqueous solutions. Such copolymers can optionally comprise a unit C being at least one monomer compound with ethylenic unsaturation with a neutral charge which is copolymerisable with units A and B, preferably a hydrophilic monomer compound with ethylenic unsaturation with a neutral charge, carrying one or more hydrophilic groups, which is copolymerisable with units A and B. Other optional monomer units can be present, such as monomer units comprising nitrogen or sulphur atoms. Suitable copolymers can be block copolymers or random copolymers, though random copolymers are preferred.

Suitable polysulphobetaine polymers are further described in EP2272942A1, particularly paragraph [0042] to [0085].

Sulfonate Hydrotrope:

Hydrotrope are compound that solubilise hydrophobic compounds in aqueous solutions, typically by means other than micellar solubilization. Hydrotropes typically consist of a hydrophilic part and a hydrophobic part with the hydrophobic part being too small to cause spontaneous self-aggregation. As such, hydrotropes typically do not have a critical concentration above which self-aggregation occurs. Since hydrotropes improve the solubility of organic ingredients, they typically would reduce the viscosity of aqueous compositions. However, it has surprisingly been found that in the presence of a surface modification polymer, the sulfonate hydrotropes, described herein, increase the viscosity of the aqueous composition.

Suitable hydrotropes for use in the present invention are preferably alkylaryl sulfonates. The alkyl groups on the hydrotrope are preferably short, having six carbon atoms or less. Suitable alkylaryl sulfonate hydrotropes include, but are not necessarily limited to sodium, potassium and ammonium salts of the group of toluene sulfonate; xylene sulfonate; cumene sulfonate; naphthalene sulfonate and benezene sulfonates, and mixtures thereof. The sulfonate hydrotrope is more preferably selected from the group consisting of: xylene sulfonate; cumene sulfonate; and mixtures thereof. The sulfonate hydrotrope can have been mono- or disubstituted with hydrocarbon chains having six or less carbon atoms. Other suitable hydrotropes include alkylated and dialkylated diphenyloxide disulfonates having short alkyl chains of six or less carbon atoms, and mixtures thereof.

The alkylaryl sulfonate hydrotrope can be present at a level of from 0.01% to 5.0%, preferably from 0.1% to 3.5%, more preferably from 0.50% to 2.0% by weight of the composition.

While the composition can comprise other hydrotropes, the preferred compositions comprise less than 0.50%, or less than 0.1%, or less than 0.01% of hydrotropes other than the sulfonate hydrotrope. More preferably, the composition is free of hydrotrope other than the sulfonate hydrotrope.

Surfactant

The compositions of the present invention can comprise surfactant. Preferred surfactants can be selected from the group consisting of: nonionic surfactant, anionic surfactants, cationic surfactants, amphoteric surfactants, zwitterionic surfactants, and mixtures thereof.

Nonionic surfactants are particularly preferred. As such, the compositions of the present invention can comprise a nonionic surfactant, or a mixture thereof. This class of surfactants may be desired as it further contributes to cleaning performance of the hard surface cleaning compositions herein. It has been found that nonionic surfactants strongly contribute in achieving highly improved performance on greasy soap scum removal.

The compositions according to the present invention may comprise up to 15% by weight of the total composition of a nonionic surfactant or a mixture thereof, preferably from 0.1% to 10%, more preferably from 0.5% to 5.0%, even more preferably from 1.0% to 3.0% by weight of the total composition.

Suitable nonionic surfactants for use herein are alkoxylated alcohol nonionic surfactants, which can be readily made by condensation processes which are well-known in the art. However, a great variety of such alkoxylated alcohols, especially ethoxylated and/or propoxylated alcohols, are conveniently commercially available. Surfactants catalogs are available which list a number of surfactants, including nonionics.

Preferred alkoxylated alcohols are nonionic surfactants according to the formula RO(E)e(P)pH where R is a hydrocarbon chain of from 2 to 24 carbon atoms, E is ethylene oxide and P is propylene oxide, and e and p which represent the average degree of, respectively ethoxylation and propoxylation, are of from 0 to 24 (with the sum of e+p being at least 1). Preferably, the hydrophobic moiety of the nonionic compound can be a primary or secondary, straight or branched alcohol having from 8 to 24 carbon atoms.

Preferred nonionic surfactants for use in the compositions according to the invention are the condensation product of ethylene and/or propylene oxide with an alcohol having a straight alkyl chain comprising from 6 to 22 carbon atoms, wherein the degree of ethoxylation/propoxylation is from 1 to 15, preferably from 5 to 12 or mixtures thereof. Such suitable nonionic surfactants are commercially available from Shell, for instance, under the trade name Neodol® or from BASF under the trade name Lutensol®, and from Sasol under the tradename Marilpal®.

Amine oxide surfactants are also suitable nonionic surfactants. Examples of amine oxides for use herein are for instance coconut dimethyl amine oxides, C12-C16 dimethyl amine oxides. Said amine oxides may be commercially available from Clariant, Stepan, and AKZO (under the trade name Aromox®).

In preferred embodiments, the composition comprises limited amounts, or no anionic surfactant. As such, the hard surface composition can comprise less than 2 wt %, preferably less than 1 wt %, more preferably less than 0.5 wt %, most preferably less than 0.1% by weight of anionic surfactant. Suitable anionic surfactants include alkyl sulphonates, alkyl aryl sulphonates, or mixtures thereof. If used, suitable linear alkyl sulphonates include C8 sulphonate like Witconate® NAS 8 commercially available from Witco.

Suitable zwitterionic surfactants for use herein contain both basic and acidic groups which form an inner salt giving both cationic and anionic hydrophilic groups on the same molecule at a relatively wide range of pH's. The typical cationic group is a quaternary ammonium group, although other positively charged groups like phosphonium, imidazolium and sulphonium groups can be used. The typical anionic hydrophilic groups are carboxylates and sulfonates, although other groups like sulfates, phosphonates, and the like can be used.

Some common examples of zwitterionic surfactants (i.e. betaine/sulphobetaine) are described in U.S. Pat. Nos. 2,082,275, 2,702,279 and 2,255,082.

For example, coconut dimethyl betaine is commercially available from Seppic under the trade name of Amonyl 265®. Lauryl betaine is commercially available from Albright & Wilson under the trade name Empigen BB/L®. A further example of betaine is lauryl-imino-dipropionate commercially available from Rhodia under the trade name Mirataine H2C-HA®.

Particularly preferred zwitterionic surfactants for use in the compositions of the present invention are the sulphobetaine surfactants as they deliver optimum soap scum cleaning benefits.

Examples of particularly suitable sulphobetaine surfactants include tallow bis(hydroxyethyl) sulphobetaine, cocoamido propyl hydroxy sulphobetaine which are commercially available from Rhodia and Witco, under the trade name of Mirataine CBS® and Rewoteric AM CAS 15® respectively.

Amphoteric and ampholytic detergents which can be either cationic or anionic depending upon the pH of the system are represented by detergents such as dodecylbetaalanine, N-alkyltaurines such as the one prepared by reacting dodecylamine with sodium isethionate according to the teaching of U.S. Pat. No. 2,658,072, N-higher alkylaspartic acids such as those produced according to the teaching of U.S. Pat. No. 2,438,091, and the products sold under the trade name "Miranol", and described in U.S. Pat.

No. 2,528,378. Additional synthetic detergents and listings of their commercial sources can be found in McCutcheon's Detergents and Emulsifiers, North American Ed. 1980.

Cationic surfactants suitable for use in compositions of the present invention are those having a long-chain hydrocarbyl group. Examples of such cationic surfactants include the quaternary ammonium surfactants such as alkyldimethylammonium halogenides. Other cationic surfactants useful herein are also described in U.S. Pat. No. 4,228,044, Cambre, issued Oct. 14, 1980.

Acid System

The liquid compositions of the present invention are acidic. Therefore, the liquid hard surface cleaning composition of the present invention has a pH, measured on the neat composition, at 25° C., of less than 7.0, or from 1.5 to less than 7.0, preferably from 2.0 to 3.0, more preferably from 2.1 to 2.4.

The composition can comprise an organic acid system, for improved safety on delicate surfaces, including chromed surfaces and stainless-steel surfaces. Typically, the acid system comprises any organic acid well-known to those skilled in the art, or a mixture thereof. The organic acid system can comprise acids selected from the group consisting of: citric acid, formic acid, acetic acid, maleic acid, lactic acid, glycolic acid, oxalic acid, succinic acid, glutaric acid, adipic acid, methanesulphonic acid, and mixtures thereof, preferably acids selected from the group consisting of: citric acid, formic acid, acetic acid, and mixtures thereof.

The composition preferably comprises the acid system at a level of from 0.01% to 15%, preferably from 0.5% to 10%, more preferably from 2% to 8%, most preferably from 4% to 7.5% by weight of the total composition. The weight percentages are measured according to the added amounts of the acid, before any in-situ neutralization.

Formic acid has been found to provide excellent limescale removal performance, in combination with improved surface safety, especially for surfaces which are prone to corrosion. For improved surface safety, especially of more delicate surfaces, the composition preferably comprises formic acid as part of the acid system. In order to achieve the desired pH, the compositions of the present invention may comprise from 0.01% to 15%, preferably from 0.5% to 10%, more preferably from 1% to 8%, even more preferably from 1% to 6%, still more preferably 1% to 4%, yet more preferably 1% to 3%, yet still more preferably 2% to 3% by weight of the total composition of formic acid.

Lactic acid can be used as part of the acid system, especially where antimicrobial or disinfecting benefits are desired.

The compositions herein can comprise an alkaline material. The alkaline material may be present to trim the pH and/or maintain the pH of the compositions according to the present invention. Examples of alkaline material are sodium hydroxide, potassium hydroxide and/or lithium hydroxide, and/or the alkali metal oxides such, as sodium and/or potassium oxide or mixtures thereof and/or monoethanolamine and/or triethanolamine Other suitable bases include ammonia, ammonium carbonate, choline base, etc. Preferably, source of alkalinity is sodium hydroxide or potassium hydroxide, preferably sodium hydroxide.

Typically, the amount of alkaline material is of from 0.001% to 20% by weight, preferably from 0.01% to 10% and more preferably from 0.05% to 3% by weight of the composition.

Despite the presence of alkaline material, if any, the compositions herein would remain acidic compositions.

Optional Ingredients

The compositions according to the present invention may comprise a variety of optional ingredients depending on the technical benefit aimed for and the surface treated.

Suitable optional ingredients for use herein include other acids, chelating agents, polysaccharide polymer, crystal growth inhibitors, radical scavengers, perfumes, solvents, builders, buffers, bactericides, hydrotropes, colorants, stabilizers, bleaches, bleach activators, suds controlling agents like fatty acids, enzymes, soil suspenders, brighteners, dispersants, pigments, and dyes.

Other Acids:

Suitable other acids include inorganic acids, such as hydrochloric acid, sulphuric acid, sulphamic acid, and the like.

Thickener:

The hard surface cleaning composition preferably comprises a thickener. Preferred thickeners are anionic polymeric thickener, more preferably xanthan gum. Preferred anionic polymeric thickeners are polysaccharide polymers. As such, the compositions of the present invention may optionally comprise a polysaccharide polymer or a mixture thereof. Typically, the compositions of the present invention may comprise from 0.01% to 5% by weight of the total composition of a polysaccharide polymer or a mixture thereof, more preferably from 0.05% to 3% and most preferably from 0.05% to 1%.

Suitable polysaccharide polymers for use herein include substituted cellulose materials like carboxymethylcellulose, ethyl cellulose, hydroxyethyl cellulose, hydroxypropyl cellulose, hydroxymethyl cellulose, succinoglycan gum and naturally occurring polysaccharide polymers like Xanthan gum, gellan gum, guar gum, locust bean gum, tragacanth gum or derivatives thereof, or mixtures thereof.

In a preferred embodiment, the compositions of the present invention comprise a polysaccharide polymer selected from the group consisting of: carboxymethylcellulose, ethyl cellulose, hydroxyethyl cellulose, hydroxypropyl cellulose, hydroxymethyl cellulose, succinoglycan gum, xanthan gum, gellan gum, guar gum, locust bean gum, tragacanth gum, derivatives of the, and mixtures thereof. Preferably, the compositions herein comprise a polysaccharide polymer selected from the group consisting of: succinoglycan gum, xanthan gum, gellan gum, guar gum, locust bean gum, tragacanth gum, derivatives of the aforementioned, and mixtures thereof. More preferably, the compositions herein comprise a polysaccharide polymer selected from the group consisting of: xanthan gum, gellan gum, guar gum, derivatives of the aforementioned, and mixtures thereof. Most preferably, the compositions herein comprise xanthan gum, derivatives thereof, and mixtures thereof.

Particularly polysaccharide polymers for use herein are xanthan gum and derivatives thereof. Xanthan gum and derivatives thereof may be commercially available for instance from CP Kelco under the trade name Keltrol RD®, Kelzan S® or Kelzan T®. Other suitable xanthan gums are commercially available by Rhodia under the trade name Rhodopol T® and Rhodigel X747®. Succinoglycan gum for use herein is commercially available by Rhodia under the trade name Rheozan®.

The composition of the invention may comprise additional cleaning ingredients.

Chelating Agent

The compositions of the present invention may comprise a chelating agent or mixtures thereof, as a preferred optional ingredient. Chelating agents can be incorporated in the compositions herein in amounts ranging up to 10% by weight of the total composition, preferably from 0.01% to 5.0%, more preferably from 0.05% to 1%.

Suitable phosphonate non-polymeric chelating agents to be used herein may include alkali metal ethane 1-hydroxy diphosphonates (HEDP), alkylene poly (alkylene phosphonate), as well as amino phosphonate compounds, including amino aminotri(methylene phosphonic acid) (ATMP), nitrilo trimethylene phosphonates (NTP), ethylene diamine tetra methylene phosphonates, and diethylene triamine penta methylene phosphonates (DTPMP). The phosphonate compounds may be present either in their acid form or as salts of different cations on some or all of their acid functionalities. Preferred non-polymeric chelating agents to be used herein are diethylene triamine penta methylene phosphonate (DTPMP) and ethane 1-hydroxy diphosphonate (HEDP). In a particularly preferred execution of the present invention, the chelating agent is selected to be ethane 1-hydroxy diphosphonate (HEDP). Such phosphonate chelating agents are commercially available from Monsanto under the trade name DEQUEST®.

Polyfunctionally-substituted aromatic non-polymeric chelating agents may also be useful in the compositions herein. See U.S. Pat. No. 3,812,044, issued May 21, 1974, to Connor et al. Preferred compounds of this type in acid form are dihydroxydisulphobenzenes such as 1,2-dihydroxy-3,5-disulfobenzene.

A preferred biodegradable non-polymeric chelating agent for use herein is ethylene diamine N,N'-disuccinic acid, or alkali metal, or alkaline earth, ammonium or substitutes ammonium salts thereof or mixtures thereof. Ethylenediamine N,N'-disuccinic acids, especially the (S,S) isomer have been extensively described in U.S. Pat. No. 4,704,233, Nov. 3, 1987, to Hartman and Perkins. Ethylenediamine N,N'-disuccinic acids is, for instance, commercially available under the tradename ssEDDS® from Palmer Research Laboratories.

Suitable amino carboxylates to be used herein include tetra sodium glutamate diacetate (GLDA), ethylene diamine tetra acetates, diethylene triamine pentaacetates, diethylene triamine pentaacetate (DTPA), N-hydroxyethylethylenediamine triacetates, nitrilotri-acetates, ethylenediamine tetrapropionates, triethylenetetraaminehexa-acetates, ethanoldiglycines, propylene diamine tetracetic acid (PDTA) and methyl glycine di-acetic acid (MGDA), both in their acid form, or in their alkali metal, ammonium, and substituted ammonium salt forms. Particularly suitable amino carboxylates to be used herein are diethylene triamine penta acetic acid, propylene diamine tetracetic acid (PDTA) which is, for instance, commercially available from BASF under the trade name Trilon FS® methyl glycine di-acetic acid (MGDA), tetra sodium glutamate diacetate (GLDA) which is, for instance, commercially available from AkzoNobel under the trade name Dissolvine® GL.

Further carboxylate non-polymeric chelating agents to be used herein include salicylic acid, aspartic acid, glutamic acid, glycine, malonic acid or mixtures thereof.

Crystal Growth Inhibitor:

The liquid hard surface cleaning composition can comprise a crystal growth inhibitor, preferably a crystal growth inhibiting polymer. Crystal growth inhibitors inhibit the growth of crystals in solution, including films of solution on hard surfaces, as the water evaporates. The crystal growth inhibiting polymer can be selected from the group consisting of: homopolymers or copolymers of (meth)acrylic acid (or salts thereof); sulfonated poly(meth)acrylates; carboxylic acid esters of inulin; homopolymers and copolymers of itaconic acid (and salts thereof); and mixtures thereof.

Homopolymers or copolymers of (meth)acrylic acid (or salts thereof) and/or sulfonated poly(meth)acrylates, especially homopolymers or copolymers of acrylic acid (or salts thereof) and/or sulfonated polyacrylates are preferred. Homopolymers of (meth)acrylic acid (or salts thereof), especially homopolymers of acrylic acid (or salts thereof) are particularly preferred.

Suitable polyacrylates (or salts thereof) include homopolymers of polyacrylates, as well as modified polyacrylates. Such carboxyl containing polymers have been found to provide a crystal growth inhibitory effect, for instance, as described in CAN. J. CHEM. VOL. 66. 1988, p 1529 to p 1536. Suitable modified polyacrylates include sulfonated polyacrylates (such as poly(2-acrylamido-2-methyl propane sulfonic acid)). Examples of suitable polyacrylate crystal growth inhibitors include Antiprex® 62L, Basoscale® BA100, Sokalan RO 1000, Sokalan RO 400, and Sokalan PA 15 (supplied by BASF).

Suitable carboxylic acid esters of inulin include those described in WO2010106077 A, such as carboxylated fructan selected from the group consisting of: carboxyalkylfructan, preferably carboxyalkylinulin, having from 1 to 4 carbon atoms in the alkyl moiety; dicarboxyfructan having a degree of oxidation (DO) of from 10 to 100%, preferably 20 to 90%, expressed as a molar percentage of monosaccharide units converted into the corresponding dicarboxy analogues; 6-carboxyfructan, preferably 6-carboxyinulin; fructan polycarboxylic acid, preferably inulin polycarboxylic acid, having a degree of carboxyalkylation or carboxyacylation of from 0.2 to 3.0; and mixtures thereof.

Suitable homopolymers and copolymers of itaconic acids are disclosed in WO2006/037005 and Polymer Letters vol. 7, pp 177-180 (1969).

Suitable crystal growth inhibiting polymers can have a molecular weight of from 250 Da to 50,000 Da, or from 500 Da to 20,000 Da.

The liquid hard surface cleaning composition can comprise the crystal growth inhibiting polymer is present at a level of from 0.01% to 5%, preferably from 0.02% to 2%, more preferably from 0.05% to 1%.

Solvent

The compositions of the present invention may further comprise a solvent or a mixture thereof, as an optional ingredient. Solvents to be used herein include all those known to those skilled in the art of hard-surfaces cleaner compositions. In a highly preferred embodiment, the compositions herein comprise an alkoxylated glycol ether (such as n-Butoxy Propoxy Propanol (n-BPP)) or a mixture thereof.

Typically, the compositions of the present invention may comprise from 0.1% to 5% by weight of the total composition of a solvent or mixtures thereof, preferably from 0.5% to 5% by weight of the total composition and more preferably from 1% to 3% by weight of the total composition.

Process of Making a Liquid Hard-Surface Cleaning Composition:

The liquid hard surface cleaning composition can be made by any suitable means. However, the viscosity is further improved when the sulfonate hydrotrope is added before the surface modification polymer. As such, a preferred process for making a liquid hard surface cleaning composition comprises the steps of:
a. providing an aqueous liquid composition;
b. adding the sulfonate hydrotrope to the aqueous composition; and
c. adding the surface modification polymer as a subsequent step.

The aqueous liquid composition can comprise additional ingredients, such as surfactant, acid, and mixtures thereof, Alternatively, the additional ingredients such as surfactant, acid, and mixtures thereof, can be added in a step after the addition of the sulfonate hydrotrope or even after the surface modification polymer is added. In preferred processes, the surfactant is added before the addition of the surface modification polymer, more preferably before the addition of the sulfonate hydrotrope. The acid (and/or alkali if used) is preferably added before the addition of the surface modification polymer, more preferably before the addition of the sulfonate hydrotrope.

Acid and/or alkali can also be added at a later step in order to trim the pH to the desired value. If used, the thickener is preferably added after adding the surface modification polymer.

The sulfonate hydrotrope can be added as part of a premix.

The surface modification polymer can be added as part of a premix.

Method of Cleaning a Hard-Surface or an Object

The preferred process of cleaning a hard-surface or an object comprises the step of applying a composition according to the present invention onto the hard surface, leaving said composition on said surface, preferably for an effective amount of time, more preferably for a period comprised between 10 seconds and 10 minutes, most preferably for a period comprised between 15 seconds and 4 minutes; optionally wiping said hard-surface or object with an appropriate instrument, e.g. a sponge; and then preferably rinsing said surface with water.

The compositions of the present invention may be contacted to the surface to be treated in its neat form or in its diluted form. Preferably, the composition is applied in its neat form.

The compositions according to the present invention are particularly suitable for treating hard-surfaces located in and around the house, such as in bathrooms, toilets, garages, on driveways, basements, gardens, kitchens, etc., and preferably in bathrooms. It is however known that such surfaces (especially bathroom surfaces) may be soiled by the so-called "limescale-containing soils". By "limescale-containing soils" it is meant herein any soil which contains not only limescale mineral deposits, such as calcium and/or magnesium carbonate, but also soap scum (e.g., calcium stearate) and other grease (e.g. body grease). By "limescale deposits" it is mean herein any pure limescale soil, i.e., any soil or stains composed essentially of mineral deposits, such as calcium and/or magnesium carbonate.

The compositions herein may be packaged in any suitable container, such as bottles, preferably plastic bottles, optionally equipped with an electrical or manual trigger sprayhead.

Methods

A) pH Measurement:

The pH is measured on the neat composition, at 25° C., using a Sartorius PT-10P pH meter with gel-filled probe (such as the Toledo probe, part number 52 000 100), calibrated according to the instructions manual.

B) Viscosity

The viscosity is measured using a Rheometer, model AR 1000 (Supplied by TA Instruments) with a 4 cm conic spindle in stainless steel, 2° angle (linear increment from 0.1 to 100 $sec^{-1}$ in max. 8 minutes).

EXAMPLES

These following compositions were made comprising the listed ingredients in the listed proportions (active weight %).

Examples 1, and 2 were compositions of the present invention, while examples A and B were comparative compositions which did not comprise a sulfonate hydrotrope.

| Composition | Ex 1 wt % | Ex A* wt % | Ex 2 wt % | Ex B* wt % |
|---|---|---|---|---|
| Citric acid[1] | 1.7 | 1.7 | 1.7 | 1.7 |
| Formic acid[1] | 2.7 | 2.7 | 2.7 | 2.7 |
| C9-C11 8EO[2] | 2.2 | 2.2 | 2.2 | 2.2 |
| Polyvinylpyrrolidone[3] | 0.025 | 0.025 | — | — |
| Sulfobetaine polymer[4] | — | — | — | — |
| Polyquaternium 95[5] | — | — | 0.025 | 0.025 |
| Sodium cumene sulphonate | 1.1 | — | 1.1 | — |
| Xanthan gum[6] | 0.3 | 0.3 | 0.3 | 0.3 |
| Perfume | 0.2 | 0.2 | 0.2 | 0.2 |
| dyes | 0.008 | 0.008 | 0.008 | 0.008 |
| Water | to 100 | to 100 | to 100 | to 100 |
| Sodium Hydroxide | to pH 2.2 | to pH 2.2 | to pH 2.2 | to pH 2.2 |
| Viscosity (measured at 10 s−1 @20° C. after 24 hrs) | 158 | 145 | 164 | 144 |

*Comparative
[1]Formic acid, lactic acid and acetic acid are commercially available from Aldrich
[2]Nonionic surfactant, sourced as Marlipal ® 10/8 from Sasol.
[3]supplied by ISP Corporation under the Tradename PVP K-60 ® ((average molecular weight of 160,000)
[4]Sulphobetaine polymer of example 1.1 of EP2272942 B1, supplied by Solvay
[5]copolymer of corn starch, acrylic acid (or salts thereof) and acrylamido-propyl-methyl-ammonium chloride, supplied as Polyquart Ecoclean ® by BASF
[6]Xanthan gum is commercially available as TFCS from Jungbunzlauer The following compositions were made and the viscosity measured. Examples 3 and 4 were the same as examples 1 and 2 respectively, with the exception that a higher level of surface modification polymer was used. Similarly, comparative examples D and E were the same as comparative examples A to C respectively, with the exception that a higher level of surface modification polymer was used.

| Composition | Ex 3 wt % | Ex D* wt % | Ex 4 wt % | Ex E* wt % |
|---|---|---|---|---|
| Citric acid[1] | 1.7 | 1.7 | 1.7 | 1.7 |
| Formic acid[1] | 2.7 | 2.7 | 2.7 | 2.7 |
| C9-C11 8EO[2] | 2.2 | 2.2 | 2.2 | 2.2 |
| Polyvinylpyrrolidone[3] | 0.10 | 0.10 | — | — |
| Sulfobetaine polymer[4] | — | — | — | — |
| Polyquaternium 95[5] | — | — | 0.10 | 0.10 |
| Sodium cumene sulfonate | 1.1 | — | 1.1 | — |
| Xanthan gum[6] | 0.3 | 0.3 | 0.3 | 0.3 |
| Perfume | 0.2 | 0.2 | 0.2 | 0.2 |
| dyes | 0.008 | 0.008 | 0.008 | 0.008 |
| Water | to 100 | to 100 | to 100 | to 100 |
| Sodium Hydroxide | to pH 2.2 | to pH 2.2 | to pH 2.2 | to pH 2.2 |
| Viscosity (measured at 10 s−1 @20° C. after 24 hrs) | 160 | 148 | 161 | 122 |

As can be seen from the data above, the addition of a sulfonate hydrotrope surprisingly improves the viscosity, even though hydrotropes would typically be expected to improve the solubility of organic ingredients.

The following compositions were made and the viscosity measured. Examples 5 and 6 have the same composition, with the surface modification polymer being added before the sulfonate hydrotrope for example 5 and after the sulfonate hydrotrope for example 6. Examples 7 and 8 have the same composition, with the surface modification polymer being added before the sulfonate hydrotrope for example 7 and after the sulfonate hydrotrope for example 8.

| Composition | Ex 5 | Ex 6 | Ex 7 | Ex 8 |
|---|---|---|---|---|
| Addition order: | Surface modification polymer added before sulfonate hydrotrope wt % | Surface modification polymer added after sulfonate hydrotrope wt % | Surface modification polymer added before sulfonate hydrotrope wt % | Surface modification polymer added after sulfonate hydrotrope wt % |
| Citric acid[1] | 1.7 | 1.7 | 1.7 | 1.7 |
| Formic acid[1] | 2.7 | 2.7 | 2.7 | 2.7 |
| C9-C11 8EO[2] | 2.2 | 2.2 | 2.2 | 2.2 |
| Polyquaternium 95[5] | 0.1 | 0.1 | 0.1 | 0.1 |
| Sodium cumene sulphonate | 0.55 | 0.55 | 1.65 | 1.65 |
| Xanthan gum[6] | 0.3 | 0.3 | 0.3 | 0.3 |
| Perfume | 0.2 | 0.2 | 0.2 | 0.2 |
| Water | to 100 | to 100 | to 100 | to 100 |
| Sodium Hydroxide | to pH 2.2 | to pH 2.2 | to pH 2.2 | to pH 2.2 |
| Viscosity (measured at 10 s−1 @20° C. after 24 hrs) | 160 | 177 | 180 | 202 |

As can be seen from comparing the viscosity of composition 5 with that of composition 6, and the viscosity of composition 7 with that of composition 8, adding the surface modification polymer after adding the sulfonate hydrotrope results in a further improvement in viscosity.

Examples F to K are comparative examples and example 9 is a further example of a of composition of the present invention.

| | Examples: | | | | | | |
|---|---|---|---|---|---|---|---|
| | F* | G2* | H* | I* | J* | K* | 17 |
| Formic acid[1] | 1.8 | 1.8 | 2.5 | 2.0 | 2.0 | 2.0 | 4.0 |
| Acetic acid[1] | 8.0 | 8.0 | 5.5 | 6.0 | 5.0 | — | — |
| Citric acid | — | — | — | — | — | 8.0 | 2.0 |
| Lactic acid | — | 1.0 | 2.0 | — | 1.0 | — | 1.5 |
| $C_9$-$C_{11}$ EO8[2] | 2.2 | 5.0 | 3.0 | 5.0 | 2.5 | 2.0 | 1.8 |
| polyvinyl pyrrolidine[3] | 0.1 | — | — | 0.2 | — | — | — |
| Sulphobetaine polymer[4] | — | 0.1 | 0.5 | — | 0.15 | 0.1 | — |
| Polyquaternium 95[5] | — | — | — | — | — | — | 0.1 |
| Sodium cumene sulfonate | 1.5 | 0.75 | 0.5 | 0.25 | — | — | — |
| Sodium xylene sulfonate | — | — | — | 0.75 | 1.1 | 1.3 | 4.0 |
| n-BPP[7] | — | — | 2.0 | — | — | — | — |
| Xanthan gum[6] | 0.25 | 0.25 | 0.25 | 0.10 | 0.30 | 0.20 | 0.25 |
| Minors* | 0.25 | 0.55 | 0.10 | 0.50 | 0.3 | 0.20 | 0.3 |
| KOH-to pH: | 2.9 | 2.8 | 2.8 | — | — | — | — |
| NaOH-to pH: | — | — | — | 2.5 | 2.3 | 2.0 | 2.2 |
| Water | to 100% | to 100% | to 100% | to 100% | to 100% | to 100% | to 100% |

*preservative, dye, perfume, etc
[7]n-BPP is commercially available as DOWANOL ® DPnB from DOW The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A liquid hard surface cleaning composition comprising:
   a. a surface modification polymer, wherein the surface modification polymer is selected from the group consisting of: copolymers of corn starch, acrylic acid (or salts thereof) and acrylamido-propyl-methyl-ammonium chloride (polyquaternium 95); copolymers of diallyldimethylammonium chloride and acrylic acid (or salts thereof); and mixtures thereof); and
   b. sulfonate hydrotrope
   wherein the composition does not comprise fluorescent whitening agent,
   wherein the surface modification polymer has a molecular weight of from about 2,000 to about 1,000000 Daltons.

2. The liquid hard surface cleaning composition according to claim 1, wherein the surface modification polymer is selected from the group consisting of: copolymers of corn starch, acrylic acid (or salts thereof) and acrylamido-propyl-methyl-ammonium chloride (polyquarternium 95).

3. The liquid hard surface cleaning composition according to claim 1, wherein the surface modification polymer is present at a level of from about 0.01% to about 5.0% by weight of the composition.

4. The liquid hard surface cleaning composition according to claim 1, wherein the sulfonate hydrotrope is an alkylaryl sulfonate hydrotrope comprising an alkyl group having six carbons or less, selected from the group consisting of: sodium, potassium and ammonium salts of the group of:

toluene sulfonate; xylene sulfonate; cumene sulfonate; naphthalene sulfonate and benzene sulfonates, and mixtures thereof.

5. The liquid hard surface cleaning composition according to claim 4, wherein the sulfonate hydrotrope is selected from the group consisting of: xylene sulfonate; cumene sulfonate; and mixtures thereof.

6. The liquid hard surface cleaning composition according to claim 1, wherein the sulfonate hydrotrope is present at a level of from about 0.01% to about 5.0% by weight of the composition.

7. The liquid hard surface cleaning composition according to claim 1, wherein the composition has a pH, measured on the neat composition, at about 25° C., of from about 1.5 to less than about 7.0.

8. The composition according to claim 1, wherein the composition further comprises an organic acid, wherein the organic acid is selected from the group consisting of: citric acid, formic acid, acetic acid, maleic acid, lactic acid, glycolic acid, oxalic acid, succinic acid, glutaric acid, adipic acid, methanesulphonic acid, and mixtures thereof.

9. The composition according to claim 8, wherein the acid system comprises acid selected from the group consisting of: citric acid, formic acid, acetic acid, and mixtures thereof.

10. The composition according to claim 9, wherein said composition comprises the organic acid at a level of from about 0.01% to about 15% by weight of the total composition.

11. The composition according to claim 1, wherein the composition further comprises nonionic surfactant.

12. The composition according to claim 11, wherein the nonionic surfactant is a condensation product of ethylene and/or propylene oxide with an alcohol having a straight alkyl chain comprising from 6 to 22 carbon atoms, wherein the degree of ethoxylation/propoxylation is from about 1 to about 15 or mixtures thereof.

13. The composition according to claim 11, wherein the nonionic surfactant is present at a level of from about 0.1 to about 10% by weight of the composition.

14. The composition according to claim 1, wherein said composition further comprises a thickener, preferably an anionic polymeric thickener, more preferably xanthan gum.

15. The composition according to claim 14, wherein the thickener is an anionic polymeric thickener.

16. A method of treating a hard surface comprising the steps of:
   a. applying a composition according to claim 1 onto the hard surface, preferably wherein the hard surface is inclined;
   b. optionally leaving said composition on said surface, for a period comprised between about 10 seconds and about 10 minutes;
   c. optionally wiping said hard-surface; and
   d. rinsing said hard surface with water.

17. A process for making a liquid hard surface cleaning composition, comprising the steps of:
   a. providing an aqueous liquid composition comprising a surface modification polymer and a sulfonate hydrotrope;
   b. adding the sulfonate hydrotrope to the aqueous composition; and adding the surface modification polymer as a subsequent step, wherein the surface modification polymer is selected from the group consisting of: copolymers of corn starch, acrylic acid (or salts thereof) and acrylamido-propyl-methyl-ammonium chloride (polyquaternium 95); copolymers of diallyldimethyl-ammonium chloride and acrylic acid (or salts thereof); and mixtures thereof;
   wherein the composition does not comprise fluorescent whitening agent.

* * * * *